Oct. 5, 1926.
B. A. LINDERMAN
1,601,974
FLUID OPERATED BRAKE
Filed July 14, 1924   4 Sheets-Sheet 1
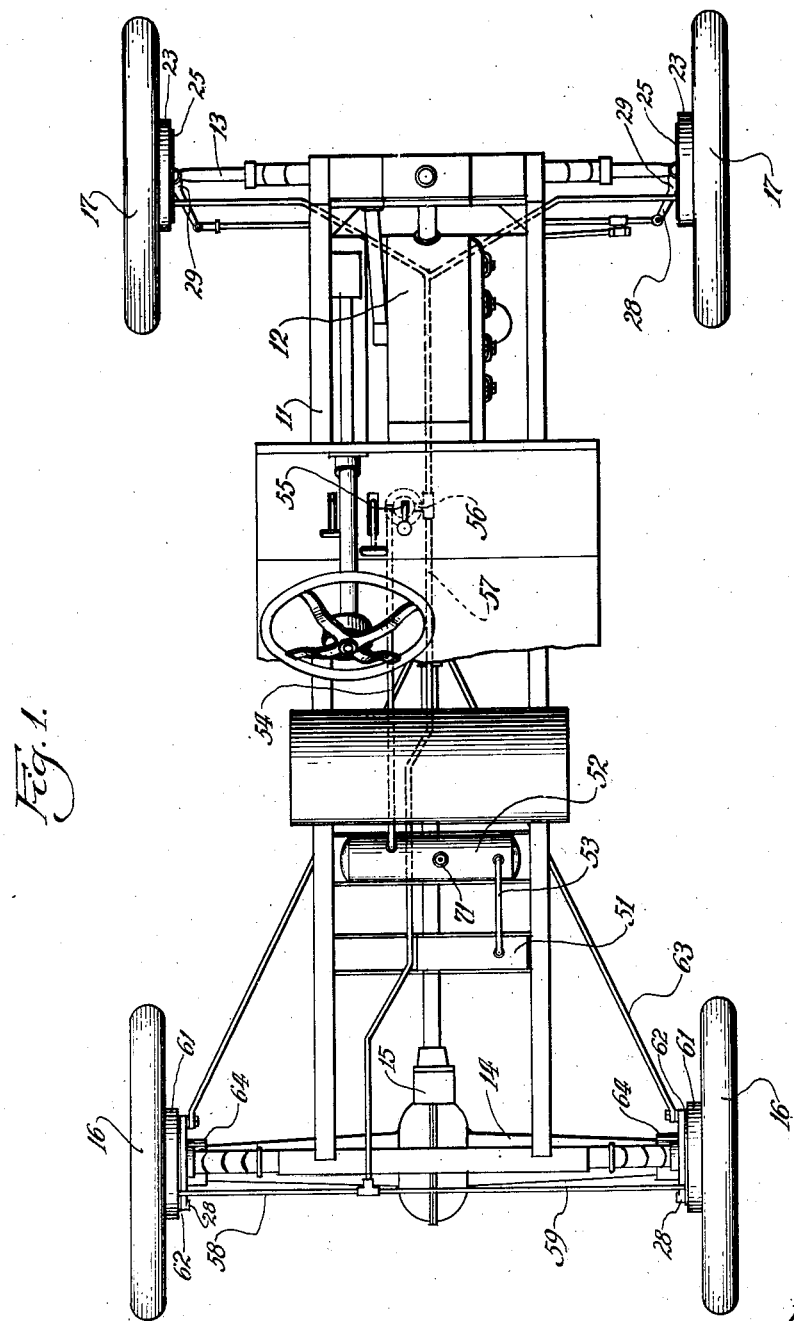
Inventor:
Bert A. Linderman
By Munday, Clarke & Carpenter
Attys.

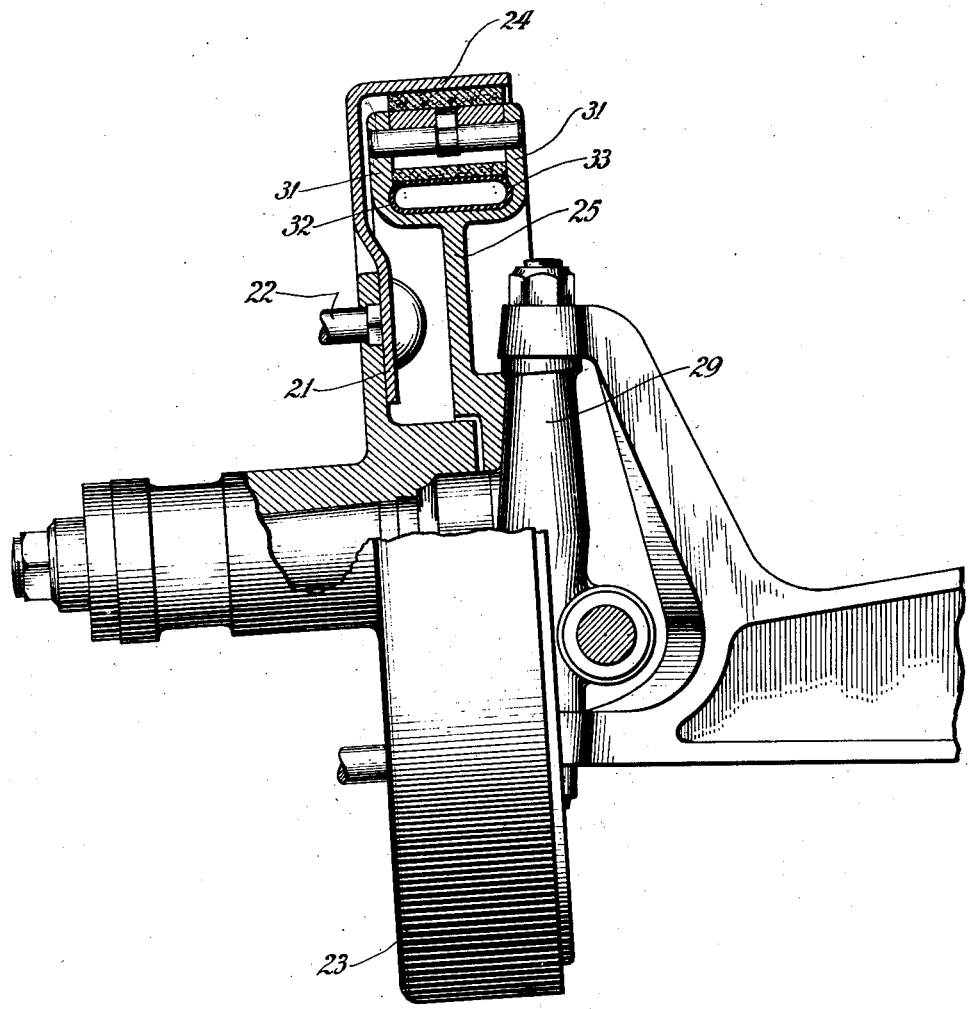

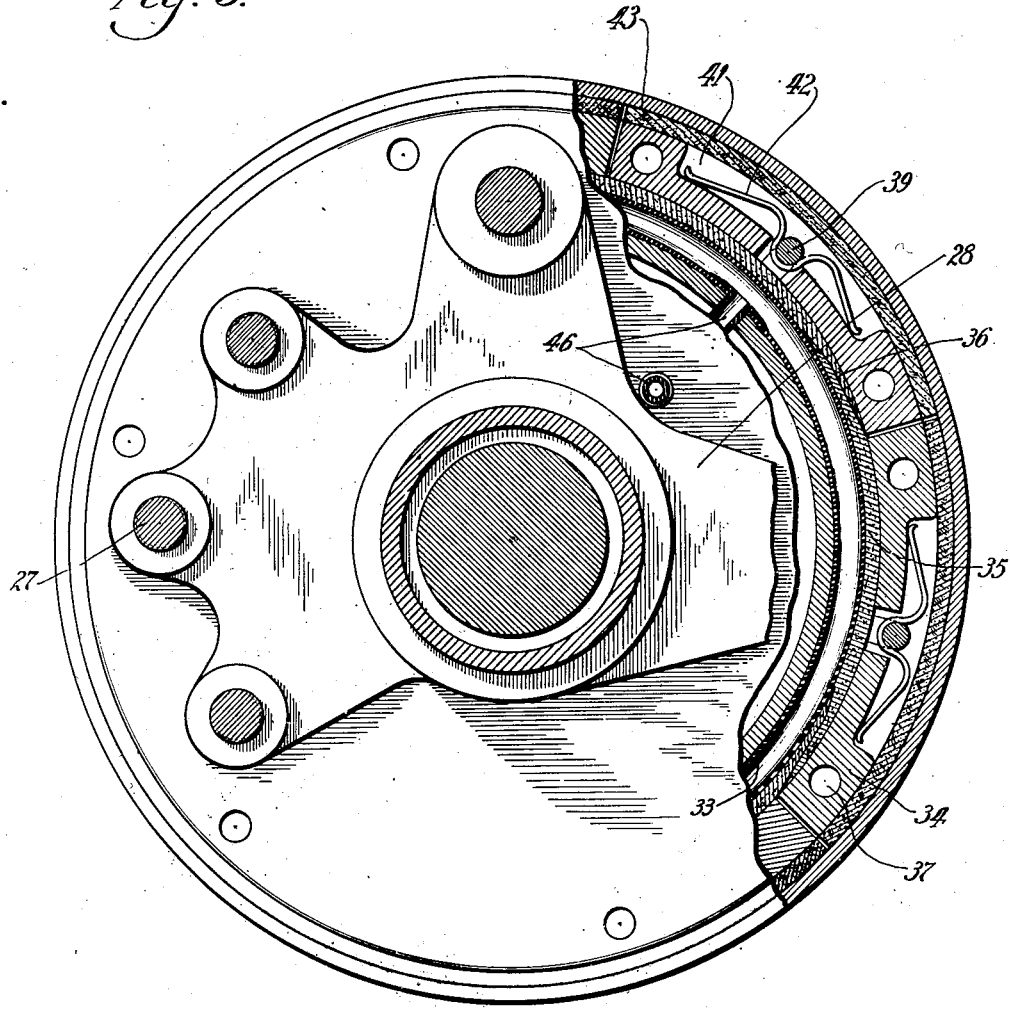

Oct. 5, 1926.
B. A. LINDERMAN
FLUID OPERATED BRAKE
Filed July 14, 1924
1,601,974
4 Sheets—Sheet 4
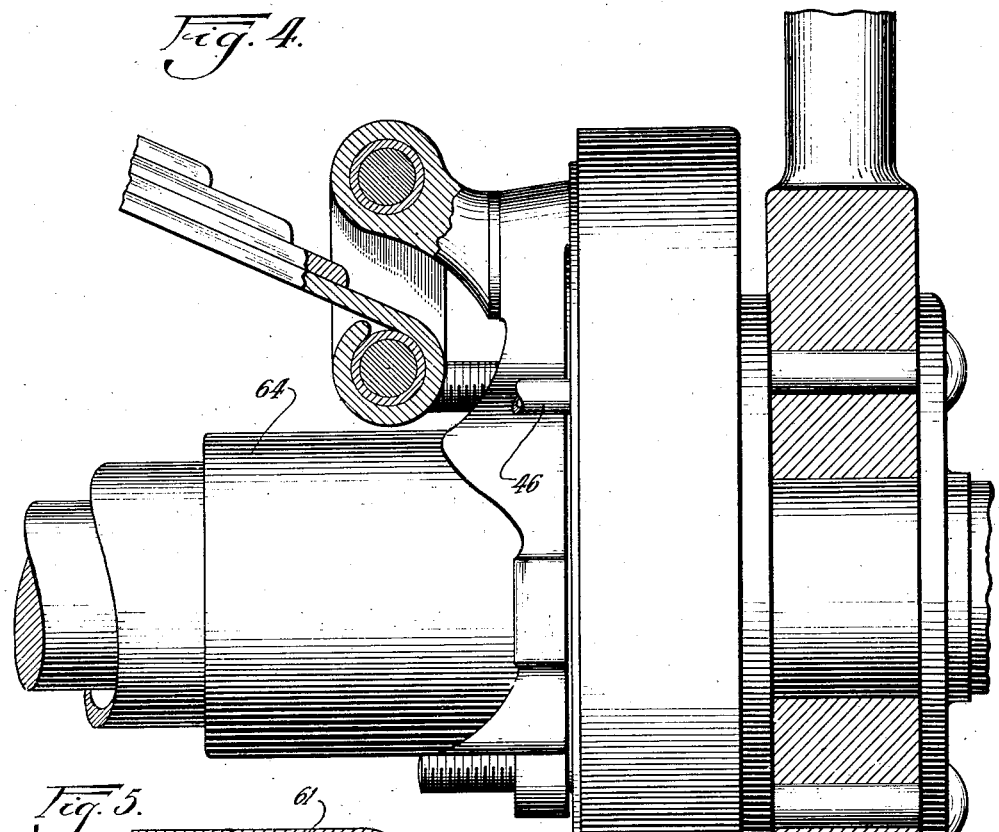
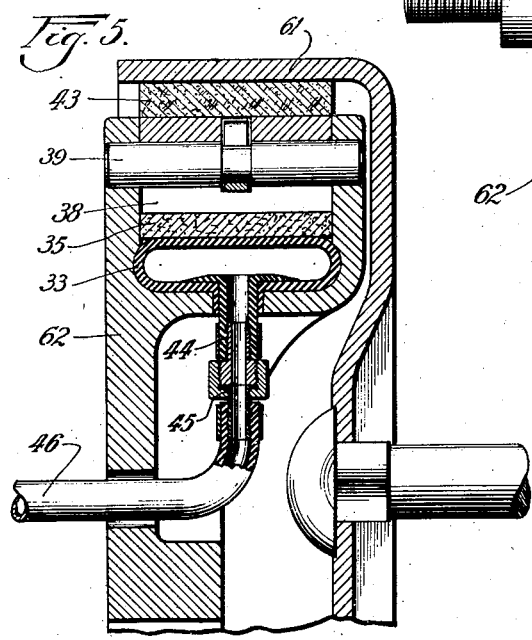
Inventor:
Bert A. Linderman
By Munday, Clarke & Carpenter
Attys.

Patented Oct. 5, 1926.

1,601,974

UNITED STATES PATENT OFFICE.

BERT A. LINDERMAN, OF NEW YORK, N. Y., ASSIGNOR TO LINDERMAN & COMPANY, OF WILMINGTON, DELAWARE, A CORPORATION OF DELAWARE.

FLUID-OPERATED BRAKE.

Application filed July 14, 1924. Serial No. 725,786.

This invention relates in general to brakes and while from certain aspects of the invention it has particular reference to brakes for automobiles, trucks, and other vehicles, it will be readily apparent that from other aspects it relates to and has valuable application in brakes for a wide variety of use.

A principal object of the present invention is the provision of a brake which will not require adjustment to compensate for wear of the braking members and which may, if desired, be duplicated for simultaneous action, as for example, at the four wheels of an automobile.

Another important object of the invention is the provision of a pneumatic or other fluid pressure brake (hydraulic if desired) wherein the air or other fluid pressure will be directly applied to and felt at the surfaces brought in contact for braking as contradistinguished from pneumatic and other fluid pressure braking organizations wherein the fluid pressure is employed merely for the actuation of bands, shoes and the like.

Another object of my invention resides in providing a brake construction of the radially shiftable brake-shoe type wherein means is provided for effectively protecting or insulating the inflatable tube which shifts the brake-shoes, from the destructive frictional heat occasioned by the braking action of the brake-shoes.

Yet another object of my invention resides in providing a brake construction of the radially shiftable brake-shoe type wherein the brake shoes are located between the inflatable tube which actuates them and the stationary braking member and wherein these brake shoes are constructed and arranged to insulate or protect the inflatable tube from the destructive and excessive heat resulting from the braking operation.

My invention contemplates as a purpose the incorporation in an automobile in such fashion that the driver or operator need only manipulate a single control and this when the braking is desired.

Numerous other objects and advantages of the invention will be apparent as it is better understood from the following description, which, taken in connection with the accompanying drawings, discloses a preferred embodiment thereof.

Referring to the drawing

Figure 1 is a top plan view of a chassis of an automobile equipped with brakes embodying my present invention;

Fig. 2 is an enlarged detail in side elevation of the brake drum at a front wheel, parts being shown in section;

Fig. 3 is a face elevation of a rear wheel drum, certain parts being broken away and others shown in section to better illustrate the construction;

Fig. 4 is a side elevation of the parts shown in Fig. 3; and

Fig. 5 is a detail section showing the air inlet into the brakes at either front or rear.

For the purposes of illustrating my invention I have shown on the drawing the chassis of an automobile comprising a frame 11, engine 12, front axle 13, rear axle organization 14 and transmission 15. Reference characters 16 indicate the rear wheels and reference characters 17 the front.

This chassis is equipped with brakes at all the four wheels. Referring first to Figs. 1, and 2 the brake construction at the front wheel will be described. A drum 21 is mounted upon the rotating member, namely the wheel, by bolts 22 or other suitable fastening devices. This drum is provided with a brake flange 24, the inner face of which is adapted for engagement for braking as will be presently described. A support or inner drum 25 is fixed against rotation in the usual manner by bolts 27 in the steering arms 28 and by engagement with the axle member 29. The support 25 has two upstanding rim members 31, which provide a circumferential channel in the support. The rim members 31 are undercut at their inner faces at 32 to provide circular recesses. A tube 33 of rubber or other inflatable material is arranged in flat condition at the base of the channel between the rim members and extends at each side into the undercut 32.

A plurality of arcuate segments or brake-shoes 34 are arranged concentrically surrounding the tube. These shoes have telescopic engagement within the circumferential channel formed by the two upstanding rim members 31, in other words, these brake-shoes fit in this channel and shift radially therein.

A slot 38 is arranged transversely of each segment and in this slot is positioned a pin 39 engaged at its end in the rim part 31 of the support. The segments are slotted at 41 to receive springs 42 engaging these segments and the pins 39 to press the segments inwardly toward the center of rotation whereby to cause them to follow the tube when the latter is deflated. Each segment is provided with a brake surfacing member 43, individualized thereto which member 43 may be of asbestos or any usual brake lining member.

The important feature of my invention resides in the provision or arrangement of means effectively to protect the rubber inflatable tube 33 from the excessive and destructive heating effects set up during the braking action when the brake-shoes 34 are shifted radially outwardly by the tube. In the construction illustrated herein as one arrangement for accomplishing this, I construct each of the arcuate brake-shoes 34 of wood or other non-heat conducting material, and preferably form openings 37 in these shoes to further reduce their heat conductivity.

In addition, each segment or brake-shoe 34 is provided at its inner face with an interliner section or individual protective lining 35 of canvas or other suitable material, each of which interliner sections 35 extends beyond its segment at one end into bevelled or over-lapping relation with the interliner section of the next adjacent segment as indicated at 36. By means of this construction and arrangement these interliner sections 35, while permitting the free expansion and contraction of the rubber inflatable tube 33, at the same time also protect the tube from the heating effect of the braking action and in addition prevent the tube from being pinched between the contiguous or adjacent ends of the brake-sections 34 as they shift radially. Manifestly other heat insulating or protecting arrangements for the rubber inflatable tube are within the contemplation of my invention and other constructions of the brake-shoe elements are contemplated.

Air or other fluid pressure is admitted to the tube to expand the same and move the segments radially outwardly against the drum, this being accomplished through an inlet composed of a nipple or conduit 44, which may be of rubber, metal or any desired material, rubber being selected as preferred. The nipple or neck 44 (Fig. 5) is connected by a coupling 45 with an inlet and outlet tube 46 arranged through the support.

Referring now to Fig. 1, reference character 51 indicates an air compressor adapted for actuation from the transmission 15. This delivers the air or other fluid pressure to an accumulator 52 through a pipe or conduit 53. The accumulator is in free communication with a pipe 54 leading to a control valve 55 conveniently arranged for manipulation by the driver of the vehicle. From this valve a pipe 56 communicates with a main brake supply pipe 57 which extends lengthwise of and beneath the vehicle. At the rear two branch pipes 58 and 59 lead to the tubes of the rear brakes. The rear brake construction is identical with the front except that the support 62 is fixed to the radius or torsion rods 63 and the axle collar 64, the drum 61 being secured to the wheel in the usual fashion. If desired the compressor may be run continuously, suitable relief valves being provided at 71 in the accumulator and a predetermined pressure thus constantly maintained at the source of fluid under pressure. When the valve 55 is opened by the hand or foot of the driver this air pressure is directly communicated simultaneously and substantially instantaneously to the four tubes and through them directly to the segments. The pressure is equal at all four brakes and since it is directly applied to the segments complete equalization is insured independently of the relative wear of the brake lining members 43.

It will be apparent that when each tube 33 expands under the fluid pressure in braking, it moves with a diaphragm action, forcing the segments outwardly. The extension of these tubes into the recesses at the sides of the channel 32 permits the central part of the outer flat face of the tube to raise and lower in exactly the manner of a diaphragm preventing wear or abrasion of the tube in service.

It will be further evident that the disposition of the inflatable tube concentrically within the series of arcuate brake shoes whereby the tube forces the brake shoes radially outwardly into operating engagement, is a distinctively novel construction, one which effects the maximum braking or clutching action. By means of this arrangement, the brake shoes, when in non-operating position, lie closely against the deflated tube, with their sides in close contact. This eliminates any gap between the adjacent sides of the brake shoes and prevents any pinching action when the tube is first inflated. This absence of pinching action is due to two features; first, because the brake shoes present no gaps when in their innermost radial position, and second, because, when the tube is first inflated the sections of the tubes opposite the solid face of the brake shoes will grip the same and as the tubes move outwardly under the inflation of the tube, the gripping action will increase so that the sections of the tube opposite the spaces between the tubes are caused to stretch and are not forced between the slightly increasing gaps as the shoes continue to move outwardly and any chafing or pinching action is also absolutely prevented by the presence of the protective casing 35.

Another distinctive advantage of my improved construction, which resides in the disposition of the inflatable tube concentrically within the shiftable arcuate shoes, lies in the fact that the clutching or gripping action of the shoes is radially outwardly so that there need be no spaces between the shoes and their radially innermost position and therefore the shoe clutching effect can be availed of against the outermost member when the outer faces of the brake shoes contact therewith. And furthermore by locating the braking surfaces farther from the axis of rotation, a more extensive peripheral braking surface is provided.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A brake comprising two concentric members adapted to rotate relatively, an inflatable tube and arcuate shoes concentrically disposed between said members, said shoes being shiftable radially by the inflation of said tube to effect braking action between said members, and said shoes being constructed and arranged to insulate said tube from the heat of friction due to the braking action.

2. A brake for automobiles and the like, comprising, a drum member rotatable with the member to be braked, an inflatable tube arranged within said drum, braking segments arranged between said tube and drum and adapted for radial movement upon inflation of said tube, said segments being of heat insulating material.

3. A brake for automobiles and the like, comprising, a drum member rotatable with a member to be braked and an inflatable tubular ring within said drum member, braking segments of heat-insulating material arranged between said tube and drum and adapted for radial movement upon inflation of the tube, and lining material arranged between said segments and said tube.

4. In a device of the character described, two members concentrically surrrounding an axis of rotation, said members being capable of relative angular movements, a series of radially shiftable arcuate devices arranged concentrically between said members, an inflatable tubular ring concentrically disposed intermediate said members and actuated to shift said devices to effect a braking action between said members, and two concentric layers of protective media interposed between said members, one of said media being brake lining and disposed as a facing for said devices and the other of said media being constructed and arranged to prevent the pinching of said tube by the said shiftable devices.

5. A brake for automobiles and the like, comprising an inflatable tube arranged around the axis of the rotating member to be braked, and braking members radially expansible with said tube and means disposed between said tube and said members and overlapping the spaces between said members for preventing the pinching of said tube during contraction and expansion.

6. In a brake for automobiles and the like, the combination of a brake drum attached to the member to be braked, braking means movable into engagement with said brake drum, an inflatable tube for moving said braking means, fluid pressure means for inflating the tube, and a channel support for said tube, said support being formed with under-cut recesses at the sides of the channel to receive side parts of the tube thereby causing the outer central part of said tube to present a flat surface and to raise and lower with a diaphragm action.

7. In a brake for automobiles and the like, the combination of a brake drum attached to the member to be braked, braking means movable into engagement with said brake drum, an inflatable tube for moving said braking means, fluid pressure means for inflating the tube, and a channel support for said tube, the channel of said support being formed with under-cut side walls to flatten the part of said tube contacting with said braking means producing a diaphragm action in the raising and lowering of the tube, preventing abrasion of the latter.

8. A brake for automobiles and the like, comprising a drum rotatable with the member to be braked, a plurality of braking segments arranged within said member and movable into contact therewith to effect braking, an inflatable tube for moving said segments into and out of braking engagement with said drum, and fluid pressure means for inflating said tube, said segments being formed to prevent the pinching of the tube therebetween.

9. A brake comprising two members concentrically disposed about an axis of rotation, an inflatable tube disposed between said members, and means disposed between one of said members and said tube adapted to be radially shifted by said tube to effect braking action between said members, said means being adapted to insulate said tube from the heating effects of said braking action.

10. A brake for automobiles and the like, comprising, a drum rotatable with the member to be braked, a plurality of braking segments arranged within the member and movable into contact therewith to effect braking, an inflatable tube for moving said segments into and out of working engagement, and fluid pressure means for inflating said tube, said segments having means overlying each other and presenting a smooth surface to the tube to prevent pinching thereof.

11. In a fluid operated brake, the combination of two members concentrically disposed about an axis of rotation, one of said members being fixed and the other capable of rotation, one of said members having spaced walls at its periphery to form a circumferential channel or seat open in a direction facing the other member, an inflatable tubular ring in said seat so that the walls of said seat contact the bottom and side walls of said tubular ring, a protective lining for said inflatable tube disposed in said seat and concentrically surrounding said tube, a concentric series of arcuate shoes disposed in said seat and radially shiftable by the inflation of said tube into contact with said other member to effect braking, and spring means for each shoe adapted to shift it in opposition to the inflating movement of said tube.

12. In a fluid operated brake, the combination of two members concentrically disposed about an axis of rotation, one of said members being fixed and the other capable of rotation, one of said members having peripheral, channeled walls spaced apart to provide a circumferential radial seat open in a direction facing the other member, an inflatable tubular ring in said seat and means in said seat adapted to be radially shifted by the inflation of said tube to effect a braking action between said members, said means being adapted to insulate said tube from the frictional heat due to the braking operation.

13. In a fluid operated brake, the combination of an outer shiftable rim and an inner stationary hub concentrically disposed about the axis of rotation, an inflatable rubber tube concentrically disposed therebetween, a series of arcuate shoes concentrically disposed between said tube and said outer rim, resilient means normally maintaining said shoes out of gripping action with said outer rim, said shoes being constructed and arranged to insulate the tube from heat of friction set up by the braking operation.

14. In a fluid operated brake, the combination of two members concentrically disposed about an axis of rotation, one of said members being fixed and the other capable of rotation, radially acting brake segments carried by said fixed member, said segments and said fixed member having telescopically interfitting parts to provide for the radial shifting movement of said brake segments, an inflatable tube for radially shifting said brake segments and spring means for normally maintaining each shoe in position removed from said rotatable member.

15. In a fluid operated brake, the combination of two members concentrically disposed about an axis of rotation, one of said members being fixed and the other capable of rotation, radially acting brake segments carried by said fixed member, said segments and fixed member having telescopically interfitting parts to provide for the radially shifting movement of said brake elements, an inflatable tube for radially shifting the brake segments, and a lining member individualized to each shoe and disposed between said shoe and said tube.

16. In a fluid operated brake, the combination of two members concentrically disposed about an axis of rotation, one of said members being fixed and the other capable of rotation, radially acting brake segments carried by said fixed member, said segments and fixed member having telescopically interfitting parts to provide for the radially shifting movement of said brake elements, an inflatable tube for radially shifting the brake segments, and a plurality of lining members concentrically disposed between said tube and said shoes, said lining members having been formed with interfitting parts and constructed and arranged to permit the free expansion of said tube.

BERT A. LINDERMAN.